(12) United States Patent
Dunigan (10) Patent No.: US 11,161,535 B2
(45) Date of Patent: Nov. 2, 2021

(54) ADJUSTABLE LOAD WHEEL

(71) Applicant: Hyster-Yale Group, Inc., Fairview, OR (US)

(72) Inventor: Robert C. Dunigan, Fairview, OR (US)

(73) Assignee: HYSTER-YALE GROUP, INC., Fairview, OR (US)

( * ) Notice: Subject to any disclaimer, the term of this patent is extended or adjusted under 35 U.S.C. 154(b) by 0 days.

(21) Appl. No.: 16/841,270

(22) Filed: Apr. 6, 2020

(65) Prior Publication Data
US 2020/0231199 A1 Jul. 23, 2020

Related U.S. Application Data

(62) Division of application No. 15/911,046, filed on Mar. 2, 2018, now Pat. No. 10,618,539.
(Continued)

(51) Int. Cl.
*B62B 3/02* (2006.01)
*B66F 9/065* (2006.01)
(Continued)

(52) U.S. Cl.
CPC .............. *B62B 3/02* (2013.01); *B62B 3/06* (2013.01); *B66F 9/065* (2013.01);
(Continued)

(58) Field of Classification Search
CPC ... B62B 2203/24; B62B 2301/10; B62B 3/06; B66F 9/065
See application file for complete search history.

(56) References Cited

U.S. PATENT DOCUMENTS 3,265,158 A * 8/1966 Constable ............. B62B 3/0612
187/232
3,334,911 A 8/1967 Enters
(Continued)

FOREIGN PATENT DOCUMENTS

CN 101466585 A 6/2009
CN 104649187 A 5/2015
(Continued)

OTHER PUBLICATIONS

Superior Tire & Rubber Corp., "Casters for Electric Pallet Jacks", Seminar Materials; Retrieved on Nov. 15, 2017; http://cdn.promatshow.com/seminars/assets-2013/649.pdf; pp. 1-20.
(Continued)

*Primary Examiner* — Brian L Swenson
(74) *Attorney, Agent, or Firm* — Schwabe Williamson & Wyatt (57) ABSTRACT

A load wheel assembly for a pallet truck includes a first load arm that rotates about an axis of rotation, and a load wheel rotationally coupled to an end of the first load arm opposite from the axis of rotation. The load wheel supports a fork at an elevation above the load wheel. Additionally, the load wheel assembly includes a second load arm pivotally coupled to the first load arm at the axis of rotation and forming a load arm angle, and an adjustment mechanism further coupling the second load arm to the first load arm. The adjustment mechanism varies the load arm angle formed between the first load arm and the second load arm to adjust the elevation of the fork above the load wheel.

20 Claims, 11 Drawing Sheets

Related U.S. Application Data (60) Provisional application No. 62/467,038, filed on Mar. 3, 2017.

(51) Int. Cl.
   *B66F 9/075* (2006.01)
   *B62B 3/06* (2006.01)

(52) U.S. Cl.
   CPC ...... *B66F 9/07559* (2013.01); *B62B 2203/24* (2013.01); *B62B 2203/28* (2013.01); *B62B 2301/10* (2013.01)

(56) References Cited

U.S. PATENT DOCUMENTS

| | | | |
|---|---|---|---|
| 4,213,624 A | 7/1980 | Sanders | |
| 4,753,454 A | 6/1988 | Woehler | |
| 5,354,080 A | 10/1994 | Jones | |
| 5,752,584 A * | 5/1998 | Magoto | B62B 3/06 187/231 |
| 6,106,441 A | 8/2000 | Chen | |
| 6,371,500 B1 | 4/2002 | Goddard | |
| 6,904,641 B2 | 6/2005 | Magoto | |
| 7,191,872 B2 | 3/2007 | Gramatikov et al. | |
| 7,231,689 B2 | 6/2007 | Schreiber | |
| 7,744,335 B1 | 6/2010 | Clearly | |
| 7,845,657 B2 | 12/2010 | Waltz | |
| 8,424,887 B1 | 4/2013 | LeMeur | |
| 8,454,037 B2 * | 6/2013 | Waltz | B66F 9/07586 280/81.1 |
| 8,739,364 B2 | 6/2014 | Fromm | |
| 8,950,759 B2 | 2/2015 | Thorsen | |
| 9,567,197 B2 * | 2/2017 | Mariotti | B62B 3/0631 |
| 10,618,539 B2 | 4/2020 | Dunigan | |
| 2006/0181039 A1 * | 8/2006 | Fridlington, Jr. | B62B 3/0618 280/43.12 |
| 2006/0232030 A1 | 10/2006 | Passeri | |
| 2010/0061834 A1 | 3/2010 | Weich | |
| 2012/0263565 A1 * | 10/2012 | O'Keeffe | B66F 9/146 414/667 |
| 2015/0014948 A1 | 1/2015 | Keen | |
| 2015/0102274 A1 * | 4/2015 | He | B62B 3/0612 254/2 C |
| 2015/0274496 A1 | 10/2015 | Goncalves | |
| 2017/0050832 A1 | 2/2017 | Newell | |
| 2017/0349197 A1 * | 12/2017 | Jonasson | B66F 5/02 |
| 2018/0251145 A1 | 9/2018 | Dunigan | |

FOREIGN PATENT DOCUMENTS

| | | |
|---|---|---|
| CN | 204607515 U | 9/2015 |
| DE | 3614986 A1 | 11/1987 |
| DE | 4238187 A1 | 5/1994 |
| DE | 10255987 A | 6/2004 |
| DE | 202006014414 U1 | 2/2008 |
| EP | 439837 A1 | 8/1991 |
| EP | 2251298 A1 | 11/2010 |
| EP | 2998189 A1 | 3/2016 |
| WO | 2007/145508 A2 | 12/2007 |

OTHER PUBLICATIONS

Partial EP Search Report; Application No. EP18159954; dated Dec. 4, 2018, pp. 1-8.
EP Search Report; Application No. EP19202936.1; dated Apr. 9, 2020, pp. 1-5.
EP Search Report; Application No. EP21168240.6; dated Jul. 26, 2021, pp. 1-10.

* cited by examiner

ADJUSTABLE LOAD WHEEL

CROSS-REFERENCE TO RELATED APPLICATION

This application is a divisional application of U.S. application Ser. No. 15/911,046, filed Mar. 2, 2018, now U.S. Pat. No. 10,618,539, issued Apr. 14, 2020 which claims priority to U.S. Provisional Application No. 62/467,038, entitled "ADJUSTABLE LOAD WHEEL" and filed on Mar. 3, 2017, the contents of which are both incorporated in their entirety herein by reference.

TECHNICAL FIELD

Embodiments relate to the field of material handling vehicles, such as pallet trucks

BACKGROUND

Industrial vehicles such as forklift trucks, end-riders, center-riders, pallet trucks, walkies, and the like, may include a pair of forks configured to engage a pallet. The pallet may include one or more openings into which the forks are inserted prior to moving the pallet, and each opening may include upper and lower surfaces that provide stability to the pallet. For example, the upper surface and/or the lower surface of each opening may include one or more boards extending the width of the pallet. The forks may be inserted between the upper surface and the lower surface. An empty pallet may tend to slide across the floor during insertion of the forks into the opening(s) when one of the forks contacts the upper surface and/or the lower surface of the pallet, such as when the height of the forks is uneven.

Certain types of industrial vehicles, such as pallet trucks with fixed linkages for raising and lowering the forks, are known to have uneven fork heights and/or non-level fork surfaces due to manufacturing tolerances that may cause one fork to be either higher or lower relative to the other. The non-level forks may result in uneven lifting and lowering, and vehicles having non-level forks may tend to rock back and forth or transfer weight between the forks, such that only one load wheel may be in contact with the ground at any point in time. The effects of the uneven forks may be more pronounced when there is no load on the forks.

While fixed linkage fork elevation systems may be relatively uncomplicated and include a small number of component parts, these systems may be susceptible to tolerance stack up between the components, which may result in non-level fork surfaces. Additionally, components such as pull rods and other linkage components may require specific model matching to limit manufacturing error, which may complicate service and maintenance operations due to the part matching requirements. In some instances, a manufacturer may expend time and resources either straightening or bending the structure to get the forks to lie more evenly on the load wheels.

Some known pallet trucks have attempted to provide for adjustment of the fork height by varying the length of a pull rod. For example, an adjustment mechanism is described in U.S. Pat. No. 7,191,872 as being located at the rear of the pull rod, next to the truck frame. However, these types of known adjustment mechanisms may create bending and/or tensile forces on the pull rod as a result of the adjustment process and ensuing usage of the forks at the adjusted pull rod length, which can lead to premature failure or require additional maintenance be performed. Additionally, known adjustment mechanisms located at the rear of the pull rod typically are only accessible from underneath the forks, which may require that the forks and/or entire pallet truck be raised off the ground a sufficient distance to provide user access.

SUMMARY

A load wheel assembly for a pallet truck is disclosed herein. The load wheel assembly may include a first load arm that rotates about an axis of rotation, and a load wheel rotationally coupled to an end of the first load arm opposite from the axis of rotation. The load wheel may support a fork at an elevation above the load wheel. Additionally, the load wheel assembly may include a second load arm pivotally coupled to the first load arm at the axis of rotation and forming a load arm angle, and an adjustment mechanism further coupling the second load arm to the first load arm. The adjustment mechanism may vary the load arm angle formed between the first load arm and the second load arm to adjust the elevation of the fork above the load wheel.

In some examples, the adjustment mechanism may adjust a height of the first load wheel relative to the operating surface without changing the elevation of the first fork. Additionally, the adjustment mechanism may adjust a distance between the first load wheel and the first fork without changing the elevation of the first fork An example method is disclosed herein. The method may include locating a pallet truck on a flat operating surface. The pallet truck may include a first fork and a second fork, and an elevation of the first fork relative to the operating surface may be different than a second elevation of the second fork relative to the operating surface. The method may further include pulling a first pull rod to raise the first fork from a lowered position to a raised position, and pulling a second pull rod to raise the second fork from a second lowered position to a second raised position. Via an adjustment mechanism operably coupled to both the first pull rod and a first load wheel at least partially housed within the first fork, a height of the first load wheel may be adjusted relative to the operating surface without changing the elevation of the first fork. In some example methods, a distance between the first load wheel and the first fork may be adjusted without changing the elevation of the first fork.

Additionally, a number of apparatus and systems are disclosed herein, including means for performing the example methods.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments herein provide load wheel assemblies for pallet trucks. In various embodiments the disclosed load wheel assemblies may include a first load arm that rotates about an axis of rotation, and a load wheel rotationally coupled to an end of the first load arm opposite from the axis of rotation. In various embodiments, the load wheel may support a fork at an elevation above the load wheel, and in some embodiments, the load wheel assembly may include a second load arm pivotally coupled to the first load arm at the axis of rotation and forming a load arm angle, and an adjustment mechanism further coupling the second load arm to the first load arm. In particular embodiments, the adjustment mechanism may vary the load arm angle formed between the first load arm and the second load arm to adjust the elevation of the fork above the load wheel.

In some embodiments, the adjustment mechanism may adjust a height of the first load wheel relative to the operating surface without changing the elevation of the first fork. Furthermore, in some embodiments, the adjustment mechanism may adjust a distance between the first load wheel and the first fork without changing the elevation of the first fork.

Also disclosed are exemplary methods of using the disclosed load wheel assemblies. In some embodiments, the method may include locating a pallet truck on a flat operating surface. In some example, the pallet truck may include a first fork and a second fork, and an elevation of the first fork relative to the operating surface may be different than a second elevation of the second fork relative to the operating surface. In various embodiments, the method may further include pulling a first pull rod to raise the first fork from a lowered position to a raised position, and pulling a second pull rod to raise the second fork from a second lowered position to a second raised position. Via an adjustment mechanism operably coupled to both the first pull rod and a first load wheel at least partially housed within the first fork, a height of the first load wheel may be adjusted relative to the operating surface without changing the elevation of the first fork. In some examples, a distance between the first load wheel and the first fork may be adjusted without changing the elevation of the first fork.

Additionally, a number of apparatus and systems are disclosed herein, including means for performing the example methods.

Figure 1:
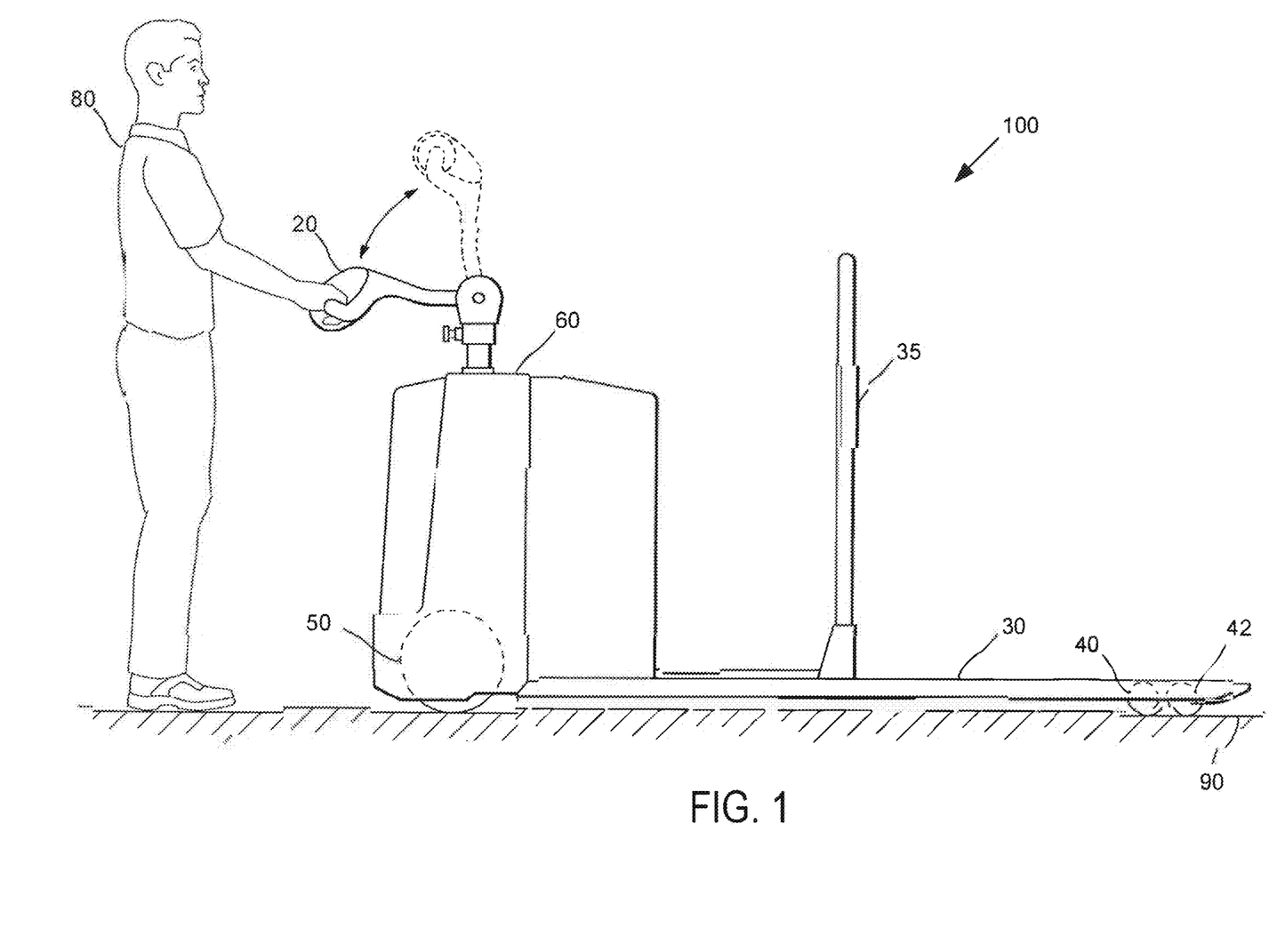
FIG. 1 illustrates an example pallet truck being controlled by an operator, in accordance with various embodiments.

Turning now to the figures, FIG. 1 illustrates an example pallet truck 100 being controlled by an operator 80. The pallet truck 100 includes a steering control device 20 to command or control various operations associated with the pallet truck 100, such as steering, braking, accelerating, hoisting, lowering, other types of vehicle operations, or any combination thereof. In various embodiments, the steering control device 20 may operate the pallet truck 100 through a mechanical linkage, a mechanical connection, one or more electrical signals, one or more wireless communications, or via a drive-by-wire system. In some embodiments, the pallet truck 100 may include motorized traction control so as to provide for a motorized vehicle.

The pallet truck 100 is shown as including forks 30 having one or more load wheels 40 and/or load rollers. In some embodiments, forks 30 may be supported by additional load wheels and/or load rollers such as a second load wheel 42. A load, such as one or more pallets, may be placed on the forks 30 during transportation. In some embodiments, a load backrest 35 may be attached to the forks 30 to provide lateral support for the load.

In the illustrated example, the pallet truck 100 is further shown as including a mounting structure or frame 60 for mounting the steering control device 20. The mounting structure 60 may be attached to the pallet truck 100 and may include a compartment for housing a traction motor for providing traction control of one or more drive wheels 50.

In some embodiments, the drive wheel 50 may primarily support the weight of the frame 60 and associated components. The load wheels 40, on the other hand, may be understood to primarily support the weight of the forks 30 and, when the pallet truck 100 is transporting a load, load wheels 40 may additionally support the weight of the load. In either the laden or unladen operating condition, both the drive wheel 50 and the load wheels 40 may be in contact with a transport surface 90, such as the floor of a warehouse or other operating surface.

Figure 2:
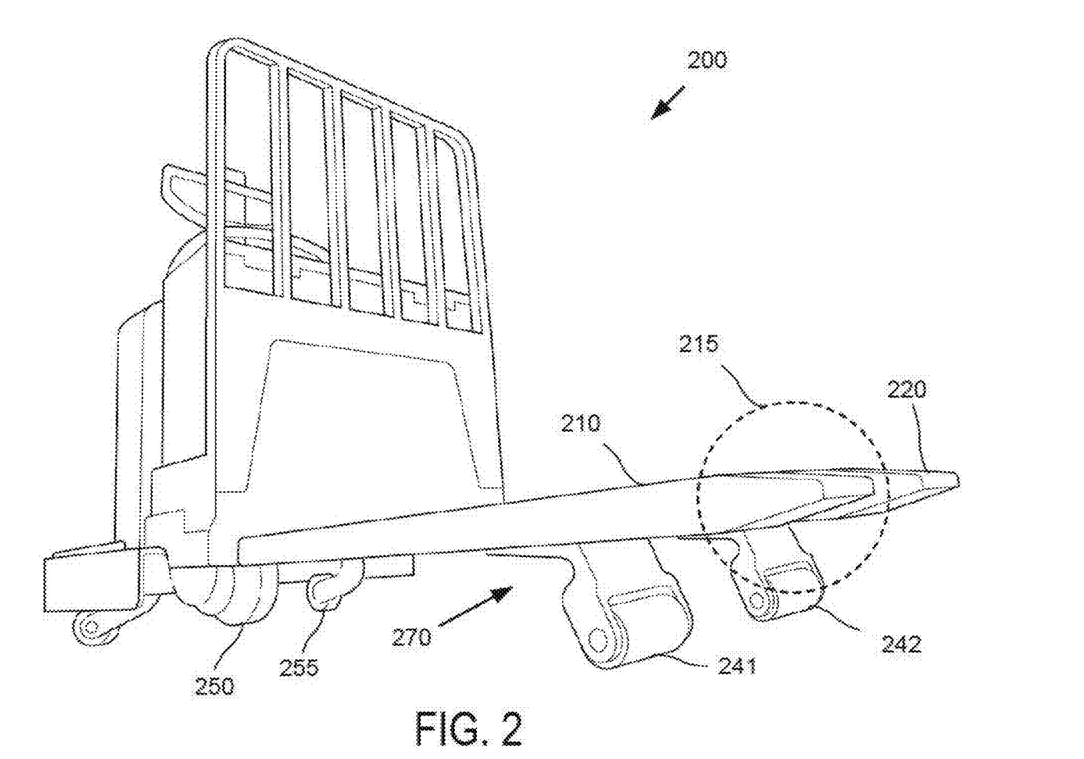
FIG. 2 illustrates an example pallet truck with a pair of forks located in a raised position, in accordance with various embodiments.

FIG. 2 illustrates an example pallet truck 200 with a first fork 210 and a second fork 220 located in a raised or elevated position. The pallet truck 200 may be motorized and may include one or more drive wheels 250, one or more casters 255, and one or more load wheels, such as a first load wheel 241 associated with first fork 210 and a second load wheel 242 associated with second fork 220. In some embodiments, the load wheel 241 and/or 242 may include rollers, tires, casters, or any combination thereof, that allow the forks 210, 220 to be positioned relative to the pallet and, ultimately, to transport the pallet from one location to the next.

First fork 210 is illustrated as including a fork tip 215. The fork tip 215 may be an integrated part of the first fork 210, e.g., manufactured together during a fabrication process, or may be attached to the ends of first fork 210, e.g., during assembly or as an aftermarket service. In some embodiments, first load wheel 241 may be located proximate to the fork tip 215 and may be raised and lowered with respect to the first fork 210. Similarly, the height of the first fork 210 and the second fork 220 may be increased or decreased relative to the ground when the load wheels 241, 242 are lowered or raised, respectively.

Figure 3:
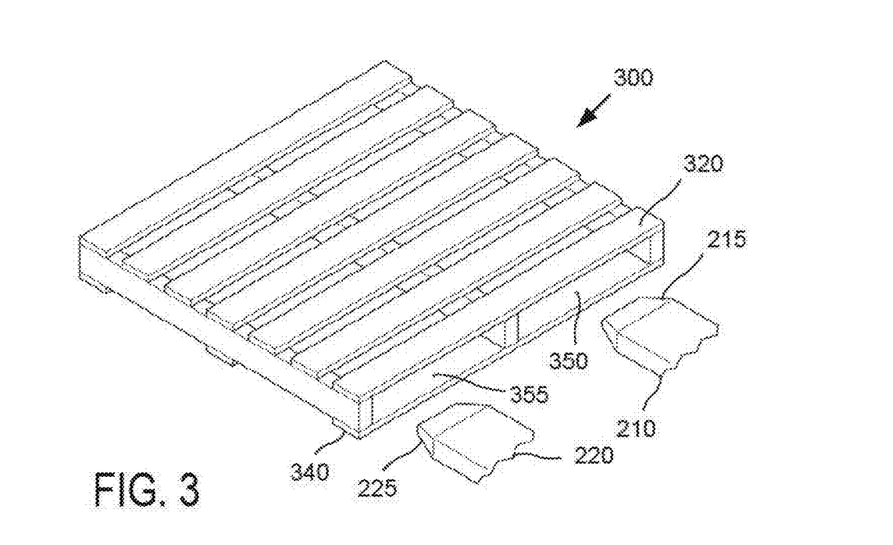
FIG. 3 illustrates a partial view of the example pallet truck of FIG. 2, with the forks being inserted into a pallet, in accordance with various embodiments.

FIG. 3 illustrates the pair of forks 210, 220 from FIG. 2, preparing to engage a pallet 300. The first fork 210 may include a first fork tip 215, as previously described, and the second fork 220 may include a second fork tip 225. The pallet 300 may be a conventional pallet made out of plastic or wood boards or planks; however, other types of pallets are also contemplated herein, including Grocery Manufacturers' Association (GMA) pallets, "Bottler's" pallets, Commonwealth Handling Equipment Pool (CHEP) "Blue" pallets, or the like.

In various embodiments, pallet 300 may include an upper portion 320 and a lower portion 340. The upper portion 320 and the lower portion 340 may form one or more openings in the pallet 300, including a first opening 350 and a second opening 355, into which the first fork 210 and the second fork 220, respectively, may be inserted. The pallet 300 may be empty or loaded. When the pallet 300 is empty, it may weigh considerably less than the forks 210, 220, such that one of the forks 210, 220 may tend to push or slide the pallet 300 across the floor when the fork tips 215, 225 are inserted into the openings 350, particularly if the forks 210, 220 are non-level or are associated with different heights.

For example, while first fork 215 may be located at the proper height to enter first opening 350, if the second fork 220 is at a higher position relative to the first fork 210, the second fork tip 225 may at least partially contact the upper portion 320 of the pallet. On the other hand, the second fork 220 is at a lower position as compared to the first fork, the second fork tip 225 may at least partially contact the lower portion 340 of the pallet 300. The tendency to push the pallet 300 may be augmented when the floor is smooth, wet, or is otherwise associated with a relatively low coefficient of friction.

Figure 4:
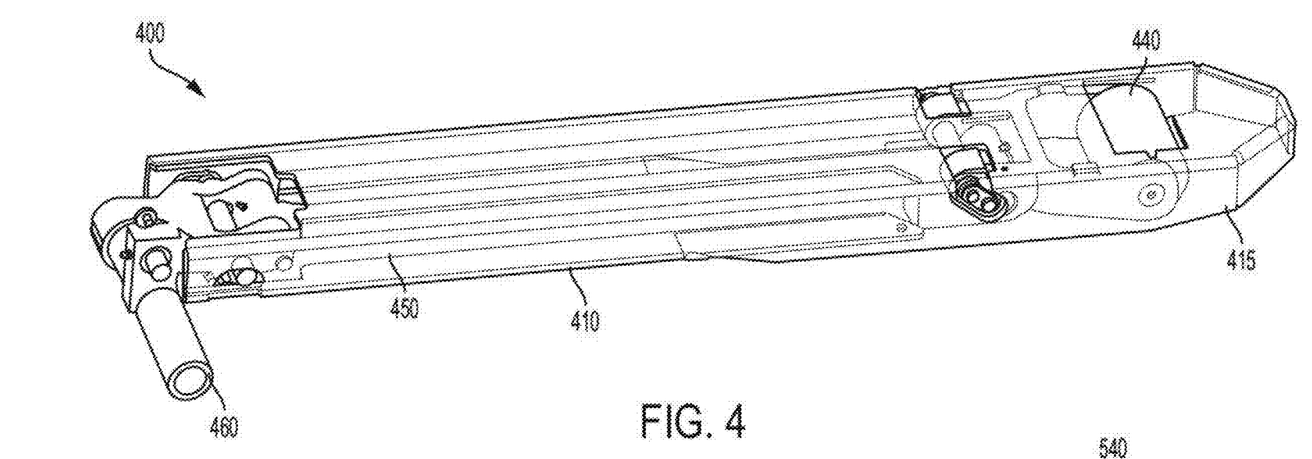
FIG. 4 illustrates an embodiment of an adjustable load wheel assembly that includes a fixed linkage system, in accordance with various embodiments.

FIG. 4 illustrates an example fork and load wheel system 400 that includes a fixed linkage system 450. A load wheel 440 is shown as being at least partially housed within a fork 410 and proximate to a fork tip 415. In some embodiments, the load wheel 440 may be pivotally coupled to the fork 410. The linkage system 450 may operably couple the load wheel 440 to a pull lever 460 located at an opposite end of the fork 410 from the fork tip 415. By pulling the pull lever 460, the fork 410 may be raised relative to the ground as the load wheel 440 pivots in a downward motion relative to the fork 410. On the other hand, by releasing the pull lever with the fork 410 in the raised position, the fork 410 may be lowered to the ground as the load wheel 440 pivots in an upward motion relative to the fork 410.

Figure 5:
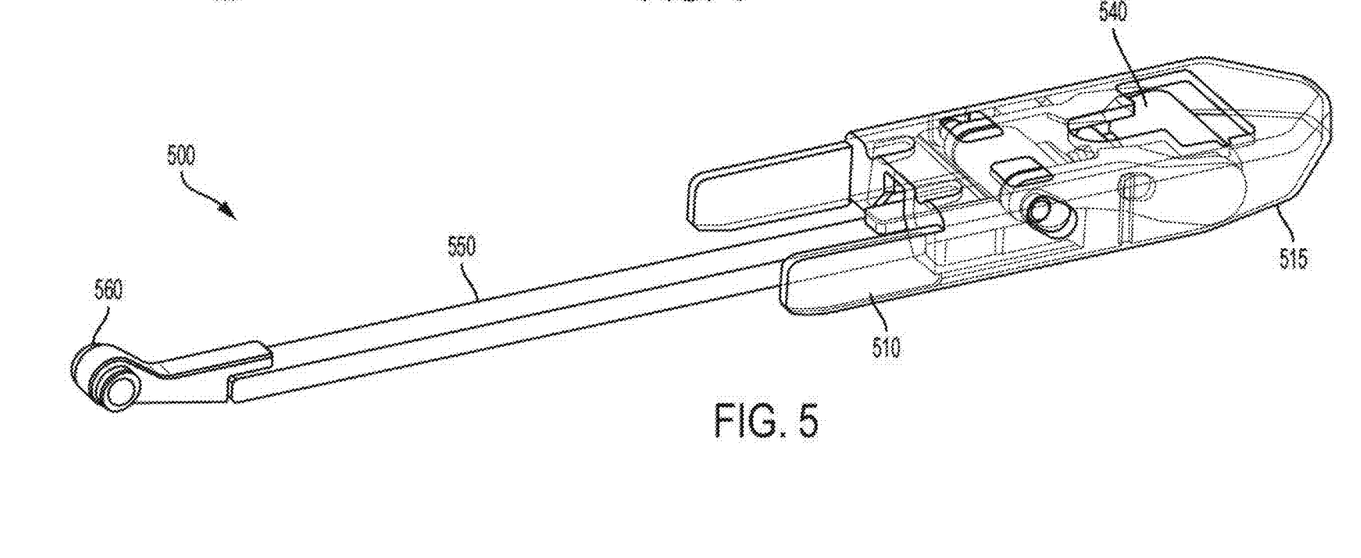
FIG. 5 illustrates another embodiment of an adjustable load wheel assembly that includes an adjustable linkage system, in accordance with various embodiments.

FIG. 5 illustrates an example fork and load wheel system 500 that includes an adjustable linkage system 550. The fork and load wheel system 500 may be configured somewhat similarly as the fork and load wheel system 400 of FIG. 4, in that a load wheel 540 may be at least partially housed within a fork 510 (partially shown) and proximate to a fork tip 515. Additionally, the load wheel 540 may be pivotally coupled to the fork 510, and the linkage system 550 may operably couple the load wheel 540 to a pull attachment 560 located at an opposite end of the fork 510 from the fork tip 515 so that the fork 510 may be raised and lowered relative to the ground as the load wheel 540 pivots in a downward and upward motion, respectively, relative to the fork 510.

Figures 6, 6A:
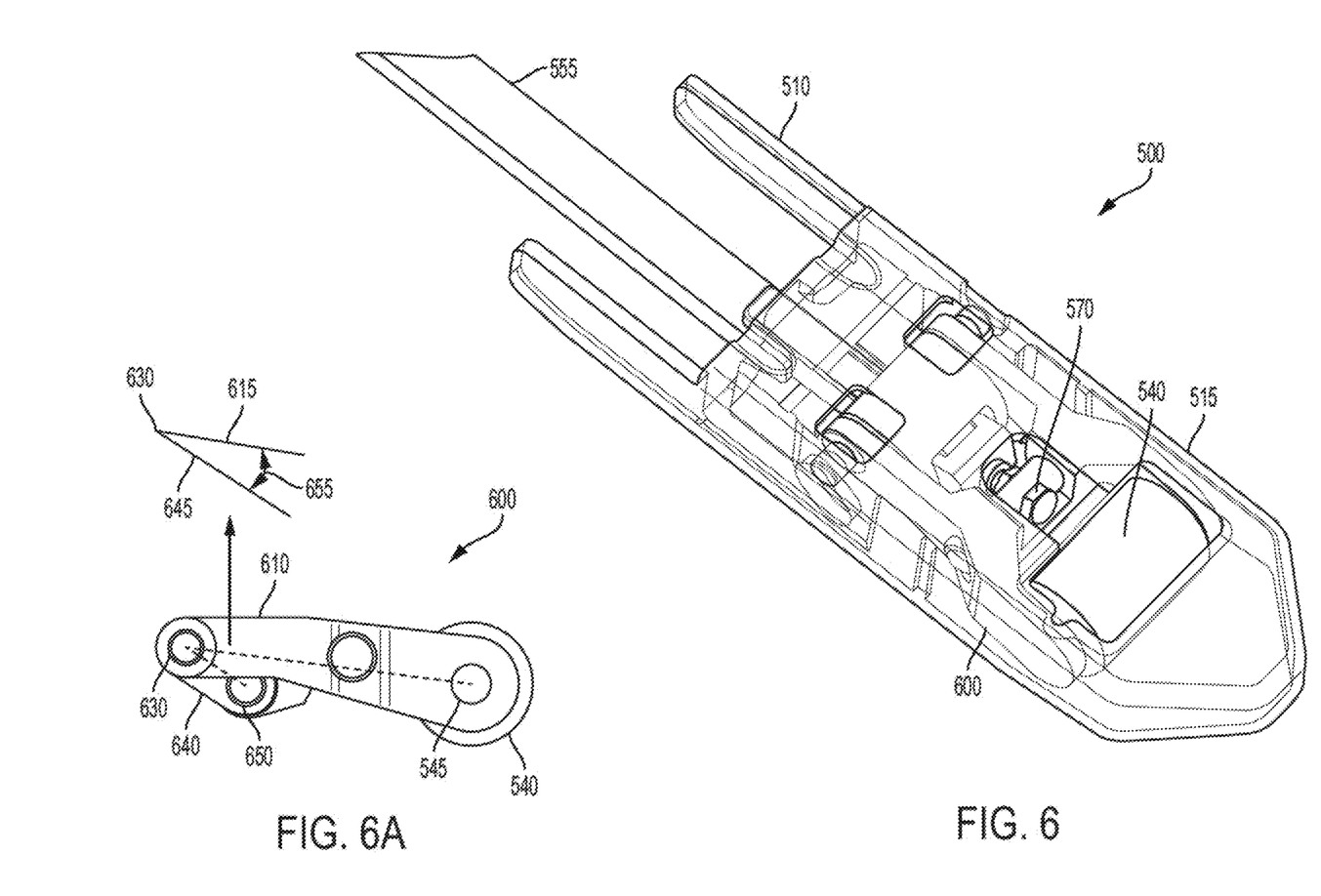
FIG. 6 illustrates an enlarged isometric view of the adjustable load wheel assembly of FIG. 5; in accordance with various embodiments.
FIG. 6A illustrates a side view of the adjustable load wheel assembly of FIG. 6, shown in isolation from the fork, in accordance with various embodiments.

FIG. 6 illustrates an enlarged isometric view of the example fork and load wheel system 500 of FIG. 5 including a load wheel assembly 600. The load wheel assembly 600 may be understood to operably couple the load wheel 540 to the fork 510. Additionally, the load wheel assembly 600 may be understood to operably couple a pull rod 555 to the load wheel 540. In a lowered position, the load wheel 540 may be understood to be at least partially housed within the fork 510 proximate to the fork tip 515. An adjustment mechanism 570 may be understood to variably adjust the position of the load wheel 540 relative to the fork 510.

For a pallet truck located on a flat operating surface, the pallet truck may include a first fork, such as fork 510, and a second fork. A first load wheel, such as load wheel 540, may be at least partially housed within the first fork.\Additionally, a second load wheel may be at least partially housed within the second fork, and an elevation of the first fork relative to the operating surface may be different than a second elevation of the second fork relative to the operating surface. In some embodiments, pulling a first pull rod, such as pull rod 555, may operate to raise the first fork from a lowered position to a raised position relative to the operating surface. Similarly, pulling a second pull rod may operate to raise the second fork from a second lowered position to a second raised position relative to the operating surface. In some examples, adjustment mechanism 570 may adjust a vertical distance between the load wheel 540 and the fork 510 without changing the elevation of the fork 510 relative to the operating surface.

FIG. 6A illustrates a side view of the example load wheel assembly 600 of FIG. 6 shown in isolation from the fork. The load wheel assembly 600 may include a first load arm 610 pivotally coupled to a second load arm 640 at a fork mounting pivot 630. The fork mounting pivot 630 may provide an axis of rotation for the entire load wheel assembly 600 relative to the fork 510 (FIG. 6).

The first load arm 610 may rotate about the axis of rotation formed by fork mounting pin 630, and the load wheel 540 may be rotationally coupled to an end of the first load arm 610 opposite from the axis of rotation. For example, the load wheel 540 may be rotationally coupled to the first load arm 610 at a load wheel axis 545. The load wheel 540 may support the fork at an elevation above the load wheel 540. In some embodiments, the first load arm 610 may be associated with a first angle of incidence 615 that passes through the centerlines of the fork mounting pin 630 and the load wheel axis 545.

The second load arm 640 may be pivotally coupled to the first load arm 610 at the axis of rotation formed by the fork mounting pin 630. In some embodiments, the second load arm 640 may be associated with a second angle of incidence 645 that passes through the centerlines of the fork mounting pin 630 and a pull rod pin 650. Additionally, a load arm angle 655 may be understood as being formed between the first angle of incidence 615 associated with the first load arm 610 and the second angle of incidence 645 associated with the second load arm 640, and as illustrated in the simplified diagram of FIG. 6A located above the example load wheel assembly 600.

In some embodiments, the pull rod 555 (FIG. 6) may be pivotally coupled to the second load arm 640 at the pull rod pin 650. In some example modes of operation, pull rod 555 may change the elevation of the fork 510 (FIG. 6) above the load wheel 540 without varying the load arm angle 655.

Figure 7:
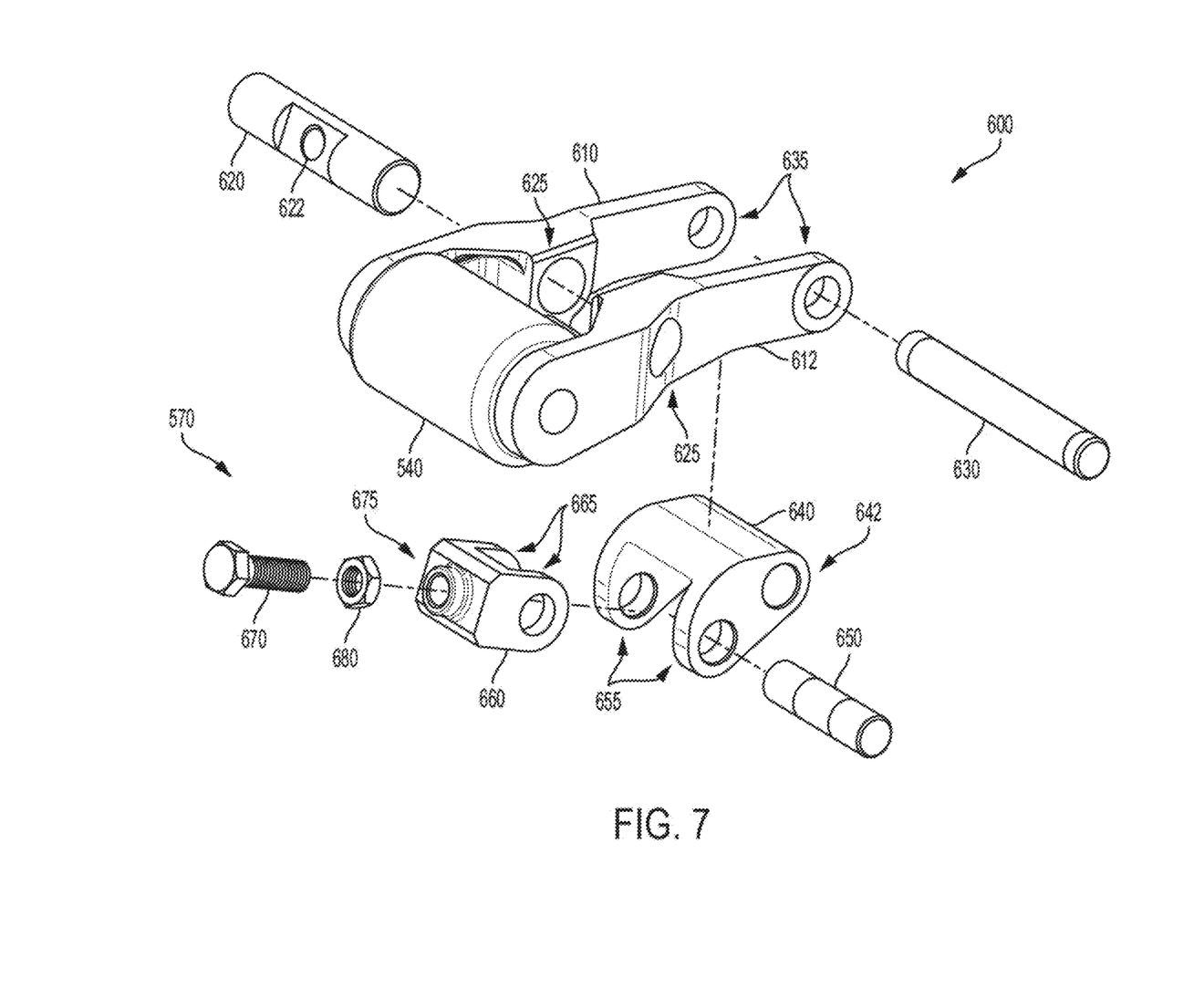
FIG. 7 illustrates an exploded view of the adjustable load wheel assembly of FIG. 6, in accordance with various embodiments.

FIG. 7 illustrates an exploded view of an example load wheel assembly of FIG. 6. The mounting pin 630 may be understood as providing an axis of rotation that passes through one or more aligned connection holes 635 formed in the first load arm 610 and through one or more connection holes 642 formed in the second load arm 640. The mounting pin 630 may pivotally couple the load wheel assembly 600 to the fork.

The adjustment mechanism 570 may be understood as coupling the second load arm 640 to the first load arm 610. Additionally, the adjustment mechanism 570 may vary the load arm angle 655 (FIG. 6A) formed between the first load arm 610 and the second load arm 640 to adjust the elevation of the fork above the load wheel 540. For example, the adjustment mechanism 570 may include a threaded shaft 670, in which a rotation of the threaded shaft 670 may operate to vary the load arm angle 655.

The adjustment mechanism 570 may include an attachment pin 620 coupled to the first load arm 610. In some embodiments, the first load arm 610 may include a pair of load arms 610, 612 between which the load wheel 540 may be mounted. The attachment pin 620 may be inserted into one or more through-holes 625 formed in the first load arm(s) 610, 612. The threaded shaft 670 may operably couple the attachment pin 620 to the second load arm 640. In some embodiments, the attachment pin 620 may be coupled to the first load arm 610 at a position intermediate the load wheel 540 and the axis of rotation formed by the mounting pin 630. Additionally, the attachment pin 620 may include a through-hole 622 centrally located in the attachment pin 620 into which the threaded shaft 670 may be inserted.

The adjustment mechanism 570 may further include an adjustable mounting structure 660 pivotally coupled to the pull rod pin 650. Additionally, the pull rod 555 (FIG. 6) may be pivotally coupled to the second load arm 640 by the pull rod pin 650. In some embodiments, the adjustable mounting structure 660 may be pivotally coupled to an end of the second load arm 640 opposite the axis of rotation provided by mounting pin 630, which passes through connection hole(s) 642.

The adjustable mounting structure 660 may include a through-hole 675 into which the threaded shaft 670 may be variably inserted to vary the load arm angle 655 (FIG. 6A). Additionally, the adjustment mechanism 570 may further include a threaded adjustment nut 680 that maintains an insertion depth of the threaded shaft 670 into the through-hole 675 after the elevation of the fork above the load wheel 540 has been adjusted. In some embodiments, the threaded shaft 670 may be inserted into the attachment pin 620 prior to attaching the threaded adjustment nut 680 to the threaded shaft 670.

Figure 8:
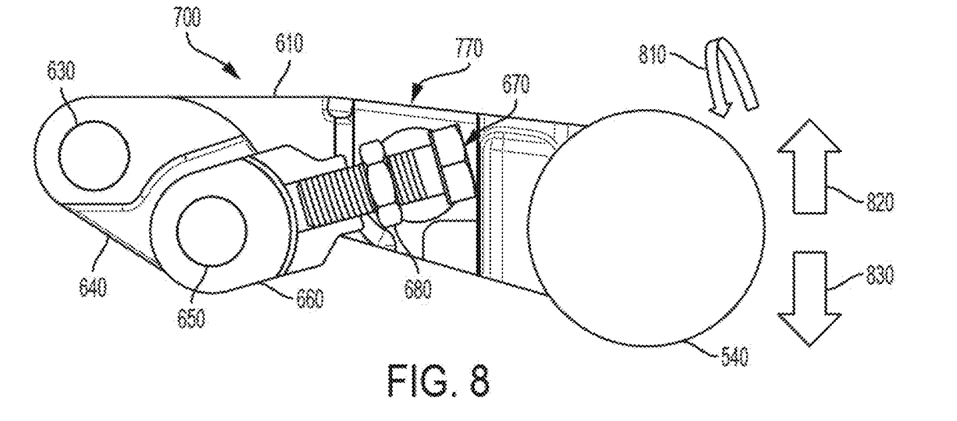
FIG. 8 illustrates a cross-sectional view of an embodiment of an adjustable load wheel assembly including a rotational adjustment device, in accordance with various embodiments.

FIG. 8 illustrates a cross-sectional view of an example load wheel assembly 700 including a rotational adjustment device 770. The rotational adjustment device 770 may include a threaded shaft 670. In some embodiments, a rotation 810 of the threaded shaft 670 in a first direction may cause the load wheel 540 to be lowered 830 relative to the fork. Similarly, the rotation of the threaded shaft 670 in a second direction may operate to raise 820 the load wheel 540 relative to the fork.

In some examples, the rotational adjustment device 770 may include threaded nut 680. Additionally, adjustable mounting structure 660 may include the threaded shaft 670 variably inserted into a through-hole of the threaded nut 680. The insertion depth of the threaded shaft into the through-hole may be secured with the threaded nut 680, after the height of the load wheel 540 relative to the operating surface is adjusted, e.g., by raising 820 or lowering 830 the load wheel 540. Additionally, the rotational adjustment device 770 may be understood to vary the distance between the pull rod pin 650 and the load wheel 540.

In some embodiments, the height of the load wheel 540 may be adjusted by varying the angle between the first load arm 610 and the second load arm 640. The height of the load wheel 540 may be adjusted without rotating the entire load wheel assembly 700 about the axis of rotation provided by mounting pin 630.

The adjustable load wheel assembly 700 may be used to adjust an uneven fork relative to the ground or operating surface. In some embodiments, the adjustable load wheel assembly 700 may be understood to independently adjust the load wheel attitude/elevation in order to reduce or eliminate any rocking or settling of the forks and/or load wheels. Still further, the adjustable load wheel assembly 700 may be understood to independently adjust the load wheel attitude/elevation in order to reduce or eliminate the effects of uneven wear that may exist on the load wheels.

Figure 9A:
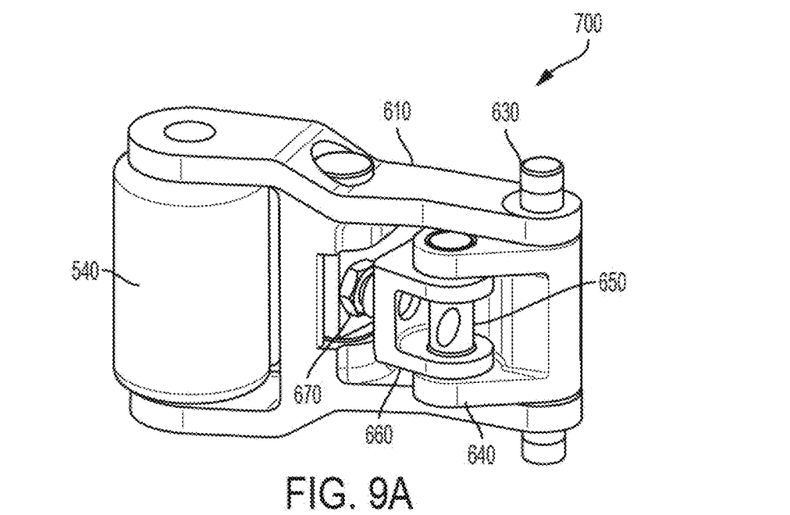
FIG. 9A illustrates a bottom view of the adjustable load wheel assembly of FIG. 8, in accordance with various embodiments.

FIG. 9A illustrates a bottom view of the example load wheel assembly 700 of FIG. 8. The ends of mounting pin 630 may be seen to extend outside of the first load arm 610 for mounting to the fork. In this view, it may be clearly seen that the threaded shaft 670 may be used to vary the rotational orientation of the load wheel 540 and the first load arm 610 relative to the mounting pin 630, while the pull rod pin 650 and the second load arm 640 may remain rotationally fixed with respect to the mounting pin 630.

Figure 9B:
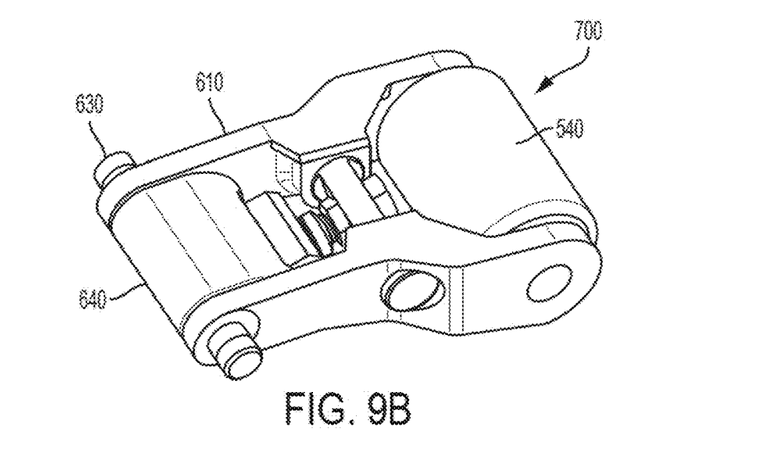
FIG. 9B illustrates an elevated side view of the adjustable load wheel assembly of FIG. 8, in accordance with various embodiments.
Figure 10A:
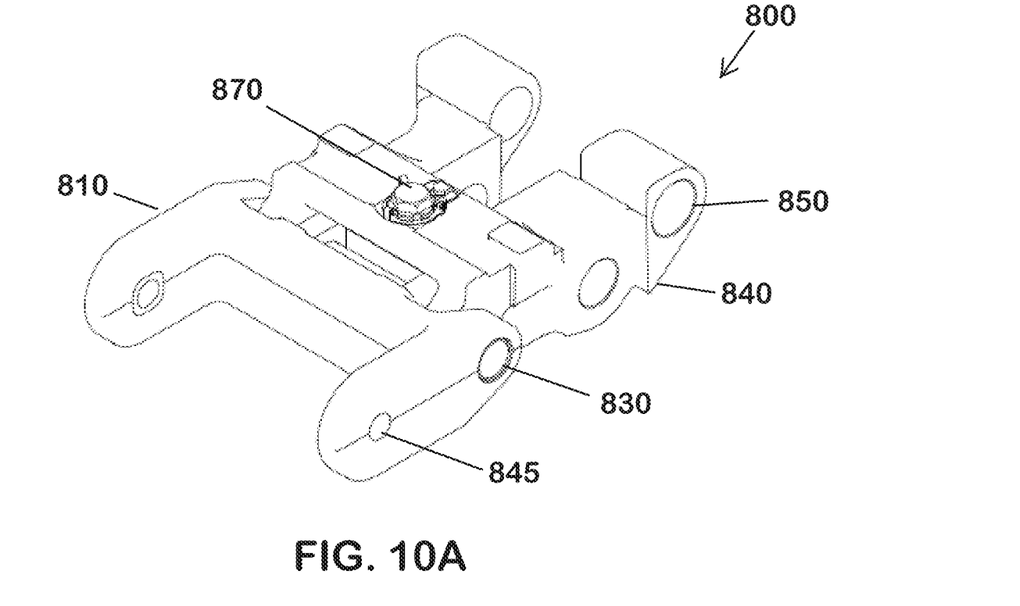
FIG. 10A illustrates a perspective view of another embodiment of an adjustable load wheel assembly, in accordance with various embodiments.
Figure 10B:
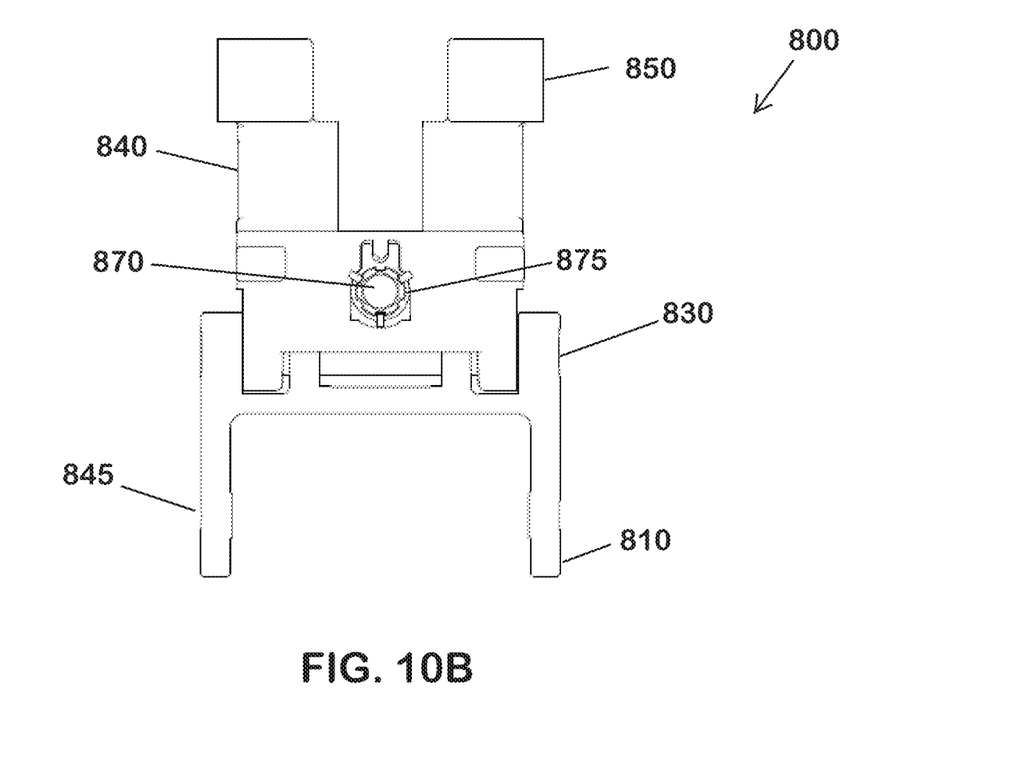
FIG. 10B illustrates a top view of the adjustable load wheel assembly of FIG. 10A, in accordance with various embodiments.
Figure 10C:
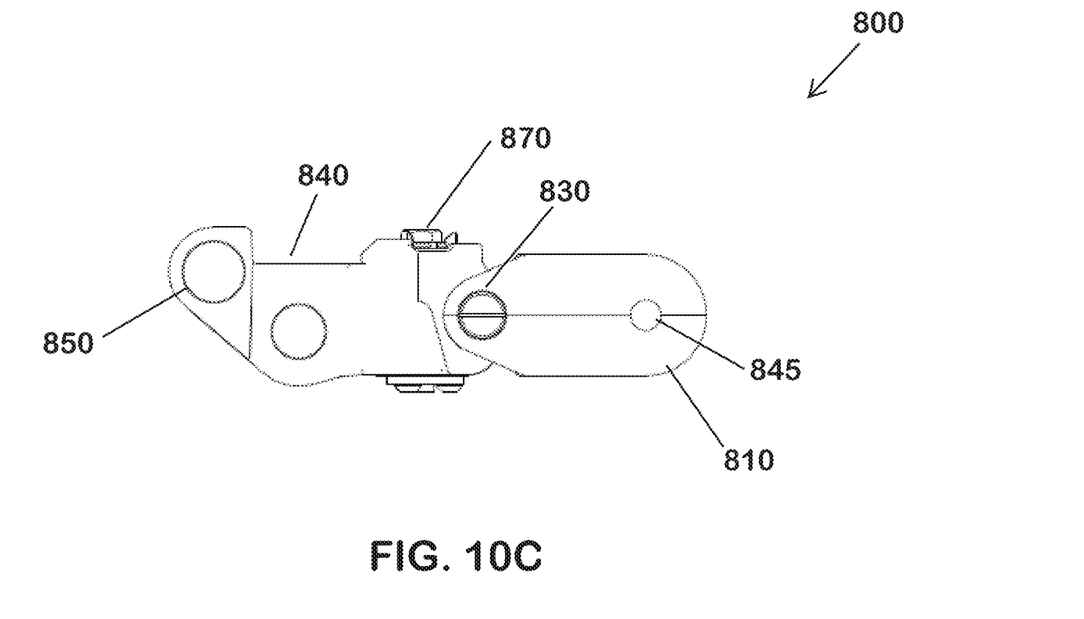
FIG. 10C illustrates a side view of the adjustable load wheel assembly of FIG. 10A, in accordance with various embodiments.
Figure 10D:
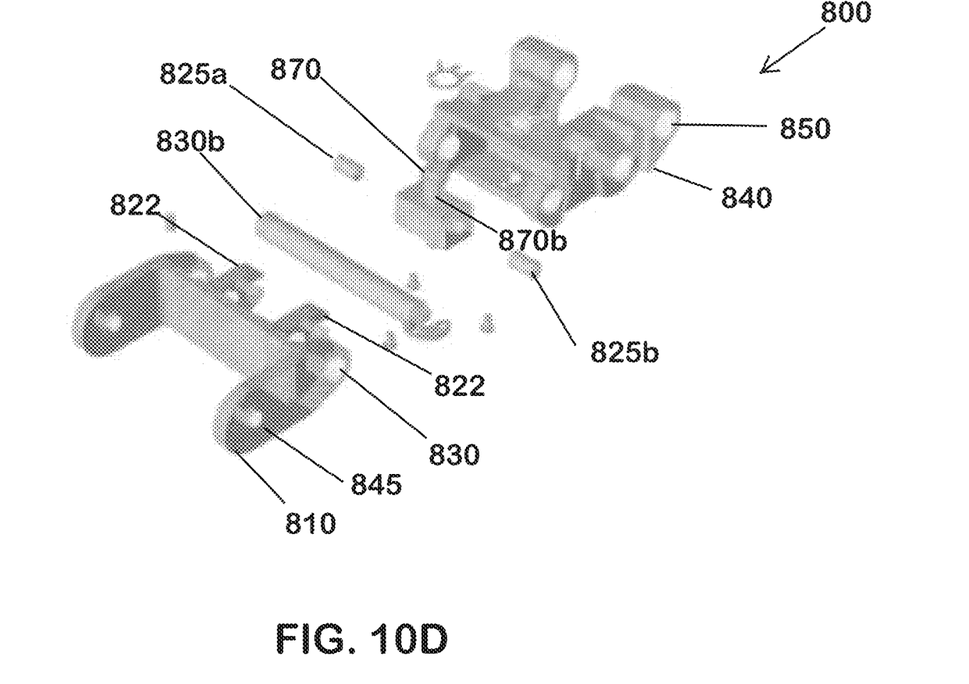
FIG. 10D illustrates an exploded view of the example load wheel assembly of FIG. 10A, in accordance with various embodiments.

FIG. 9B illustrates an elevated side view of the example load wheel assembly 700 of FIG. 8. In this view, it can be clearly seen that mounting pin 630 passes through both of the first load arm 610 and the second load arm 640 to provide a common axis of rotation, such as when the pull rod is activated to lower the load wheel 540.

FIGS. 10A-D illustrate several views of another embodiment of an adjustable load wheel assembly, including a perspective view (FIG. 10A), a top view (FIG. 10B), and side view (FIG. 10C), and an exploded view (FIG. 10D), in accordance with various embodiments. The load wheel assembly 800 may include a first load arm 810 pivotably coupled to a second load arm 840 at a fork mounting pivot 630. The fork mounting pivot 830 may provide an axis of rotation for the entire load wheel assembly 800 relative to the fork.

The first load arm 810 may rotate about the axis of rotation formed by fork mounting pin 830b, and the load wheel may be rotationally coupled to an end of the first load arm 810 opposite from the axis of rotation. For example, the load wheel may be rotationally coupled to the first load arm 810 at a load wheel axis 845. The load wheel may support the fork at an elevation above the load wheel. In some embodiments, the first load arm 810 may be associated with a first angle of incidence that passes through the centerlines of the fork mounting pin 830 and the load wheel axis 845.

The second load arm 840 may be pivotally coupled to the first load arm 810 at the axis of rotation formed by the fork mounting pin 830b. In some embodiments, the second load arm 840 may be associated with a second angle of incidence that passes through the centerlines of the fork mounting pin 830 and an aperture 850 for a pull rod pin. Additionally, a load arm angle may be understood as being formed between the first angle of incidence associated with the first load arm 810 and the second angle of incidence associated with the second load arm 840.

In some embodiments, the pull rod may be pivotally coupled to the second load arm 840 at the pull rod pin aperture 850. In some example modes of operation, the pull rod may change the elevation of the fork above the load wheel without varying the load arm angle.

The mounting pin 830b may be understood as providing an axis of rotation that passes through one or more aligned connection holes formed in the first load arm 810 and through one or more connection holes formed in the second load arm 840. The mounting pin 830b may pivotally couple the load wheel assembly 800 to the fork.

The adjustment mechanism 870 may be understood as coupling the second load arm 840 to the first load arm 810. Additionally, the adjustment mechanism 870 may vary the load arm angle formed between the first load arm 810 and the second load arm 840 to adjust the elevation of the fork above the load wheel. For example, the adjustment mechanism 870 may include a threaded shaft 870b, in which a rotation of the threaded shaft 870b may operate to vary the load arm angle.

The adjustment mechanism 870 may include an adjustable mounting structure 820 pivotably coupled to the second load arm 810 at pivot points 822 by a pair of load pins 825a, 825b. The adjustable mounting structure 820 may be translatable along the axis of the threaded shaft 870b, causing the first load arm to pivot about the load pins 825a, 825b. The adjustable mounting structure 820 may include a throughhole 875 into which the threaded shaft 870 may be variably inserted to vary the load arm angle.

FIGS. 11A-D illustrate several views of another embodiment of an adjustable load wheel assembly, including a perspective view (FIG. 11A), a top view (FIG. 11B), and side view (FIG. 11C), and an exploded view (FIG. 11D), in accordance with various embodiments. The adjustable load wheel assembly 900 may include a load arm 910 pivotably coupled to fork at a fork mounting pivot 930. The fork mounting pivot 930 may provide an axis of rotation for the entire adjustable load wheel assembly 900 relative to the fork. One or more pull rods may be pivotably coupled to the load arm 910 at pull rod aperture 950. Actuation of the pull rod may cause the adjustable load wheel assembly 900 to pivot about fork mounting point 930.

The load arm 910 may be pivotably coupled to a wheel assembly that includes first and second pivot brackets 940a, 940b, a fixed wheel 942, and an adjustable wheel 944. In various embodiments, first and second pivot brackets 940a, 940b may couple to the load arm 910 at pivot bracket mounting aperture 940c. First and second pivot brackets 940a, 940b may, in turn, each rotationally couple to two load wheels: a fixed load wheel 942 and an adjustable load wheel 944. The fixed load wheel 942 may include a hub defining an axis that passed through the geometric center of the fixed load wheel. The fixed load wheel 942 may be rotationally disposed on a fixed axle that couples to the first and second pivot brackets 940a, 940b near the ends of the first and second pivot brackets 940a, 940b that are positioned closer to the load arm 910, An adjustable load wheel 944 having an eccentric hub (e.g., one that does not pass through the geometric center of the adjustable load wheel), may be disposed on a drive axle 948 near the ends of first and second pivot brackets 940a, 940b that are farther from the load arm 910. In various embodiments, the adjustable load wheel 944 may be releasably coupled to the first and second pivot brackets 940a, 940b by a drive axle 948 and secured with a nut 946. In various embodiments, because of the eccentric hub of the adjustable load wheel, changing the orientation of the eccentricity with respect to the load arm 910 may alter a distance between the drive axle 948 and the operating surface.

Thus, disclosed in some embodiments are load wheel assemblies for pallet trucks, comprising: a load arm that is rotatable about an axis of rotation, wherein the load arm has a first end that pivotably couples to at least one pull rod and a second end opposite the first end that pivotably couples to a wheel assembly comprising a fixed wheel and an adjustable wheel. In various embodiments, the wheel assembly may further comprise first and second pivot brackets pivotably disposed at or adjacent to the second end of the load arm. In various embodiment, each of the first and second pivot brackets may have a first end that extends toward the load arm and a second end, opposite the first end, extending away from the load arm.

In various embodiments, the fixed wheel may be rotatably disposed between the respective first ends of the first and second pivot brackets. In various embodiments, the adjustable wheel may be rotatably disposed between the respective second ends of the first and second pivot brackets. In various embodiments, the fixed wheel may have a hub that is disposed through the geometric center of the fixed wheel. The adjustable wheel may have an eccentric hub. The orientation of the eccentric hub may be adjusted by a user to adjust the distance between the load arm and the operating surface. Actuation of the pull rod may cause the load arm to pivot about the axis of rotation.

Figure 11A:
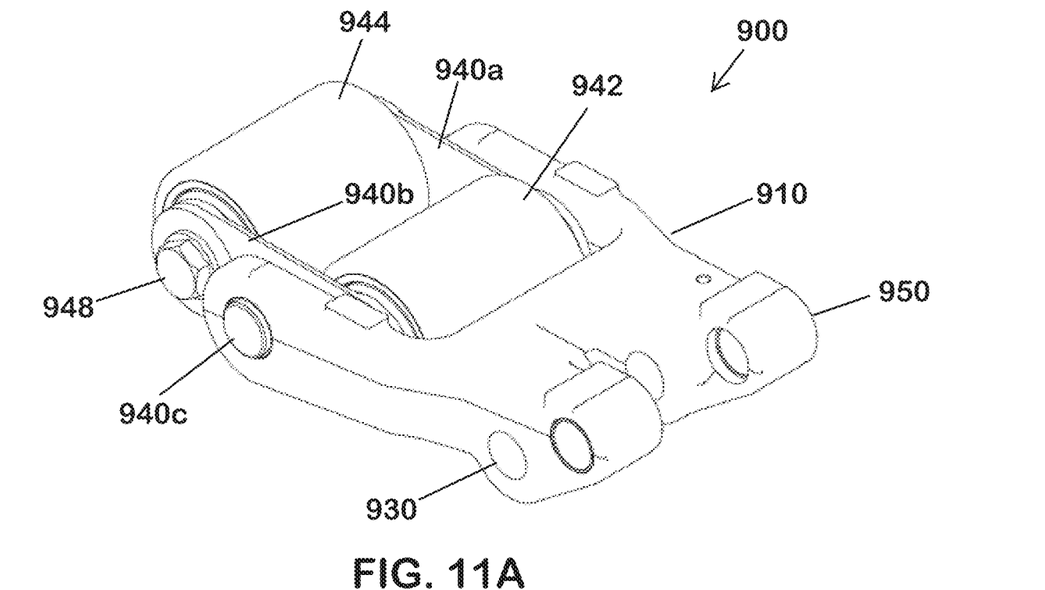
FIG. 11A illustrates a perspective view of another embodiment of an adjustable load wheel assembly, in accordance with various embodiments.
Figure 11B:
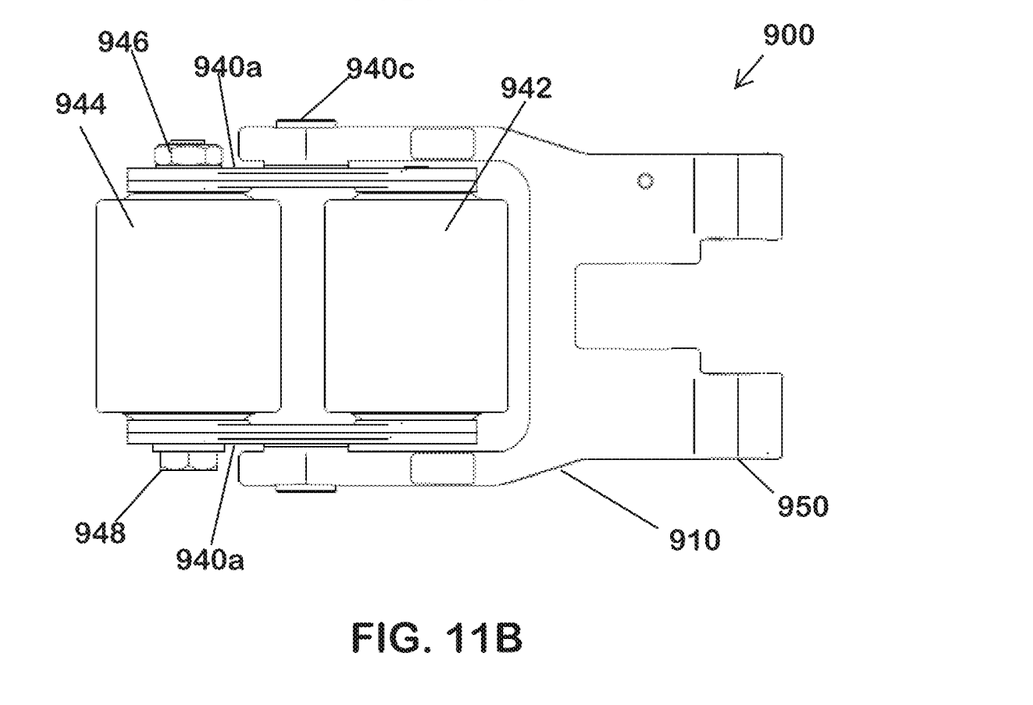
FIG. 11B illustrates a top view of the adjustable load wheel assembly of FIG. 11A, in accordance with various embodiments.
Figure 11C:
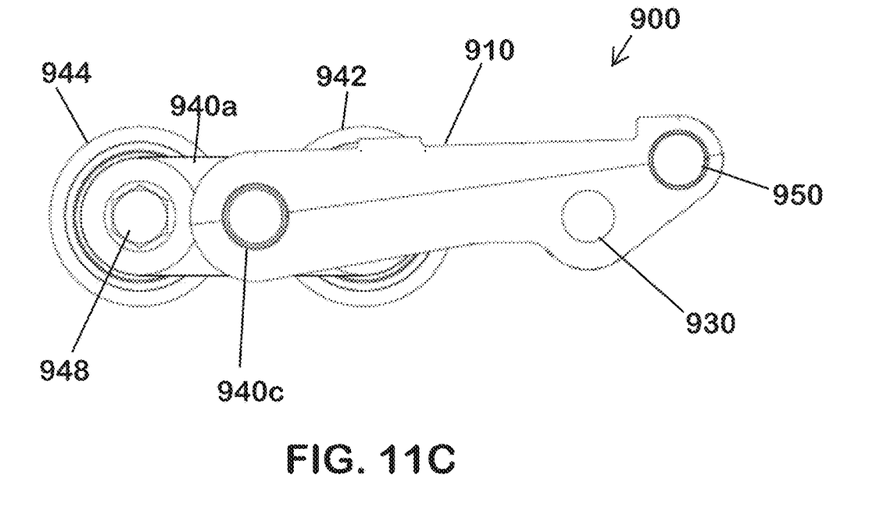
FIG. 11C illustrates a side view of the adjustable load wheel assembly of FIG. 10A, in accordance with various embodiments.
Figure 11D:
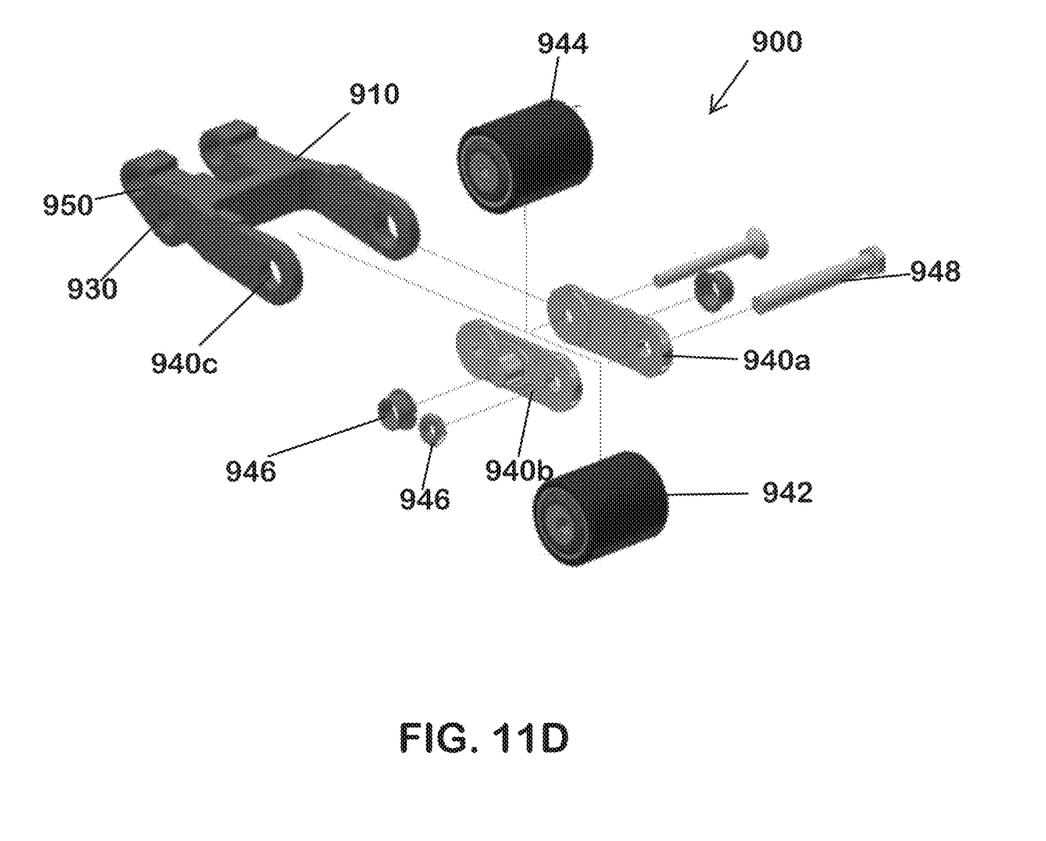
FIG. 11D illustrates an exploded view of the adjustable load wheel assembly of FIG. 11A, in accordance with various embodiments.
Figure 12:
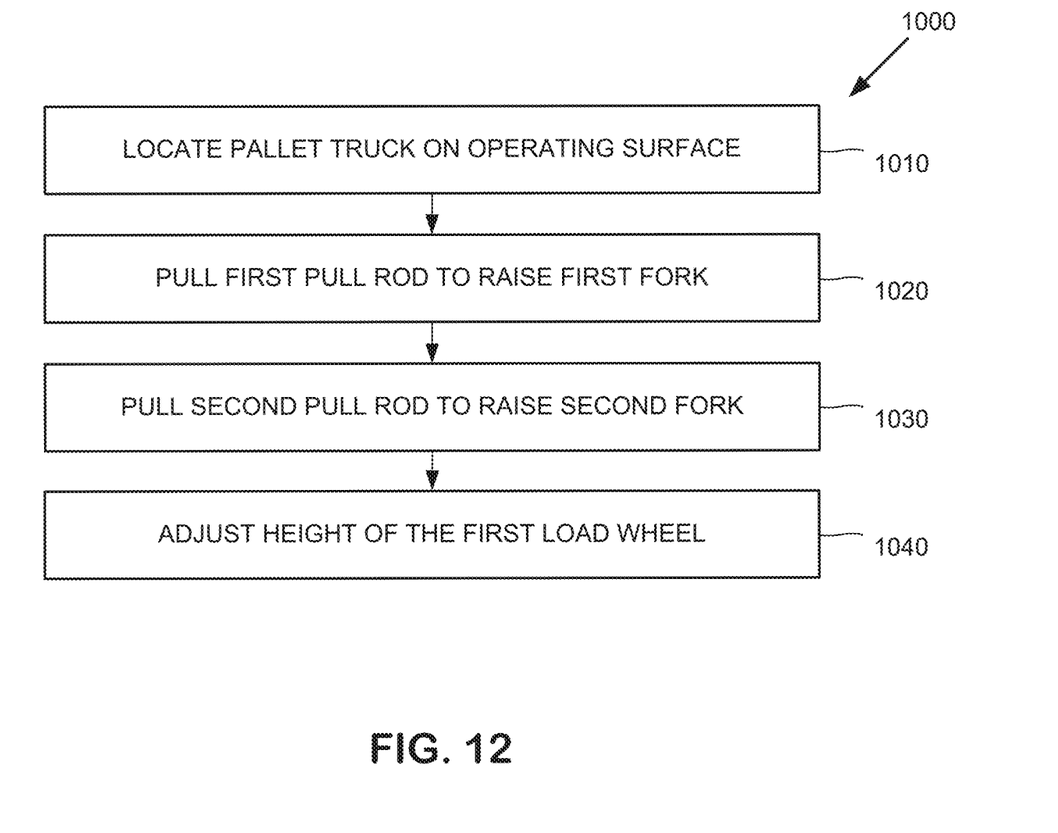
FIG. 12 illustrates an example process of operating an adjustable load wheel assembly that includes an adjustable linkage system, in accordance with various embodiments.

The orientation of the eccentric hub may be controlled by the position of the drive axle 948. Thus, the distance between the drive axle 948 and the operating surface may be adjusted by loosening the nut 946, rotating the drive axle 948 to a desired position in the first and second pivot brackets, and re-securing the nut 946 to fix the drive axle 948 in a desired position. In so doing, the position of the eccentric hub may be controlled and the position of the outer surface of the adjustable load wheel 944 relative to the operating surface may be controlled with precision. FIG. 10 illustrates an example process 1000 of operating a load wheel assembly that includes an adjustable linkage system. At operation 1010, a pallet truck may be located on a flat operating surface. The pallet truck may include a first fork and a second fork.

At operation 1020, a first pull rod may be pulled to raise the first fork from a lowered position to a raised position.

At operation 1030, a second pull rod may be pulled to raise the second fork from a second lowered position to a second raised position. In some examples, an elevation of the first fork relative to the operating surface may be different than a second elevation of the second fork relative to the operating surface in one or both of the raised or lowered operating positions.

At operation 1040, via an adjustment mechanism operably coupled to both the first pull rod and a first load wheel at least partially housed within the first fork, a height of the first load wheel may be adjusted relative to the operating surface without changing the elevation of the first fork. The height of the first load wheel may be varied by adjusting a distance between the first load wheel and the first fork without pulling the first pull rod.

The adjustment mechanism may include a rotational adjustment device, and the height of the first load wheel may be adjusted by rotating the rotational adjustment device in a first rotational orientation to increase the height of the first load wheel relative to the operating surface. Additionally, the rotational adjustment device may be rotated in a second rotational orientation to decrease the height of the first load wheel relative to the operating surface.

In some embodiments, the process 1000 may further include lowering both the first fork and the second fork, and the height of the first load wheel relative to the operating surface may be adjusted with the first fork in the lowered position. In other embodiments, the first pull rod and the second first pull rod may be pulled at the same time, and the height of the first load wheel relative to the operating surface may be adjusted after the first and second pull rods have both been pulled, with the first fork and second fork located in the raised position.

A second load wheel may be at least partially housed within the second fork, and the distance between the first load wheel and the first fork may be adjusted while a second distance between the second load wheel and the second fork remains fixed.

An adjustable load wheel assembly may allow the manufacturer, dealer, customer, operator or other use to fine-tune or "dial" in the adjustment to the load wheel elevation/attitude on the assembly line or in the field, such as to accommodate possibly uneven load wheel wear during operation of the pallet truck. Additionally, manufacturing tolerances may be relaxed somewhat, since error adjustment may be resolved after the manufacturing and/or assembly process, via the load wheel adjustment mechanism.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An apparatus including a load wheel assembly for a material handling vehicle, the apparatus comprising:
    a load arm rotatable about an axis of rotation, the load arm including a first end that pivotably couples to at least one pull rod and a second end opposite the first end; and
    a wheel assembly pivotably coupled to the second end of the load arm, the wheel assembly including:
        first and second pivot brackets pivotably disposed at or adjacent to the second end of the load arm, each of the first and second pivot brackets including a first end that extends toward the axis of rotation and a second end, opposite the first end, extending away from the axis of rotation;
        a fixed wheel rotatably disposed between the first ends of the first and second pivot brackets, wherein the fixed wheel includes a hub that is disposed through the geometric center of the fixed wheel; and
        an adjustable wheel rotatably disposed between the second ends of the first and second pivot brackets, wherein the adjustable wheel includes an eccentric hub, wherein the eccentric hub does not pass through the geometric center of the adjustable wheel.

2. The apparatus of claim 1, wherein an orientation of the eccentric hub is adjustable to decrease or increase the distance between the load arm and an operating surface for the material handling vehicle.

3. The apparatus of claim 1, wherein the adjustable wheel includes a drive axle releasably coupled to the second ends of the first and second pivot brackets to change an orientation of the eccentric hub, wherein the orientation of the eccentric hub is controllable by rotating the drive axle to a selected position in the first and second pivot brackets.

4. The apparatus of claim 3, further comprising a nut to fix the drive axle in the selected position.

5. The apparatus of claim 1, wherein the load arm is pivotable about the axis of rotation using the at least one pull rod.

6. The apparatus of claim 1, wherein the fixed wheel includes a fixed axle attached to the first ends of the first and second pivot brackets.

7. The apparatus of claim 1, wherein the load arm includes a fork mount pivot to receive a fork mount pin oriented along the axis of rotation.

8. The apparatus of claim 1, wherein the wheels are at least partially housed in a fork of the load arm.

9. A system, comprising:
a vehicle having a pair of forks;
a first load arm coupled to one of the forks and rotatable about a first axis of rotation, the first load arm including a first end that pivotably couples to a first pull rod and a second end opposite the first end; and
a second load arm coupled to the other one of the forks and rotatable about a second axis of rotation, the second load arm including a first end that pivotably couples to at least one pull rod and a second end opposite the first end; and
a wheel assembly pivotably coupled to each of the second ends of the load arms, each wheel assembly including:
first and second pivot brackets pivotably disposed at or adjacent to the second end of a respective one of the load arms, each of the first and second pivot brackets including a first end that extends toward the axis of rotation of the respective one of the load arms and a second end, opposite the first end, extending away from the axis of rotation of the respective one of the load arms;
a fixed wheel rotatably disposed between the first ends of the first and second pivot brackets of the respective one of the load arms, wherein the fixed wheel includes a hub that is disposed through the geometric center of the fixed wheel; and
an adjustable wheel rotatably disposed between the second ends of the first and second pivot brackets of the respective one of the load arms, wherein the adjustable wheel includes an eccentric hub, wherein the eccentric hub does not pass through the geometric center of the adjustable wheel.

10. The system of claim 9, wherein the wheels are at least partially housed within the pair of forks.

11. The system of claim 9, wherein the vehicle comprises a pallet truck.

12. The system of claim 9, wherein the vehicle comprises a motorized vehicle.

13. The system of claim 9, further comprising a pair of fork tips integrally formed on the pair of forks or attached to an end of the pair of forks.

14. An apparatus including a load wheel assembly for a material handling vehicle, the apparatus comprising:
a load arm rotatable about an axis of rotation, the load arm including a first end that pivotably couples to at least one pull rod and a second end opposite the first end; and
a wheel assembly pivotably coupled to the second end of the load arm, the wheel assembly including:
first and second pivot brackets pivotably disposed at or adjacent to the second end of the load arm, each of the first and second pivot brackets including a first end that extends toward the axis of rotation and a second end, opposite the first end, extending away from the axis of rotation;
a first wheel rotatably disposed between the first ends of the first and second pivot brackets; and
a second wheel rotatably disposed between the second ends of the first and second pivot brackets, wherein the second wheel includes an eccentric hub, wherein the eccentric hub does not pass through the geometric center of the second wheel.

15. The apparatus of claim 14, wherein an orientation of the eccentric hub is adjustable to decrease or increase the distance between the load arm and an operating surface for the material handling vehicle.

16. The apparatus of claim 14, wherein the second wheel includes a drive axle releasably coupled to the second ends of the first and second pivot brackets to change an orientation of the eccentric hub, wherein the orientation of the eccentric hub is controllable by rotating the drive axle to a selected position in the first and second pivot brackets.

17. The apparatus of claim 14, wherein the load arm is pivotable about the axis of rotation using the at least one pull rod.

18. The apparatus of claim 14, wherein the first wheel includes an axle attached to the first ends of the first and second pivot brackets.

19. The apparatus of claim 14, wherein the load arm includes a fork mount pivot to receive a fork mount pin oriented along the axis of rotation.

20. The apparatus of claim 14, wherein the wheels are at least partially housed in a fork of the load arm.

* * * * *